April 29, 1947.   G. E. PASCO   2,419,588
SEAL FOR ROTARY SHAFTS
Filed Feb. 26, 1945
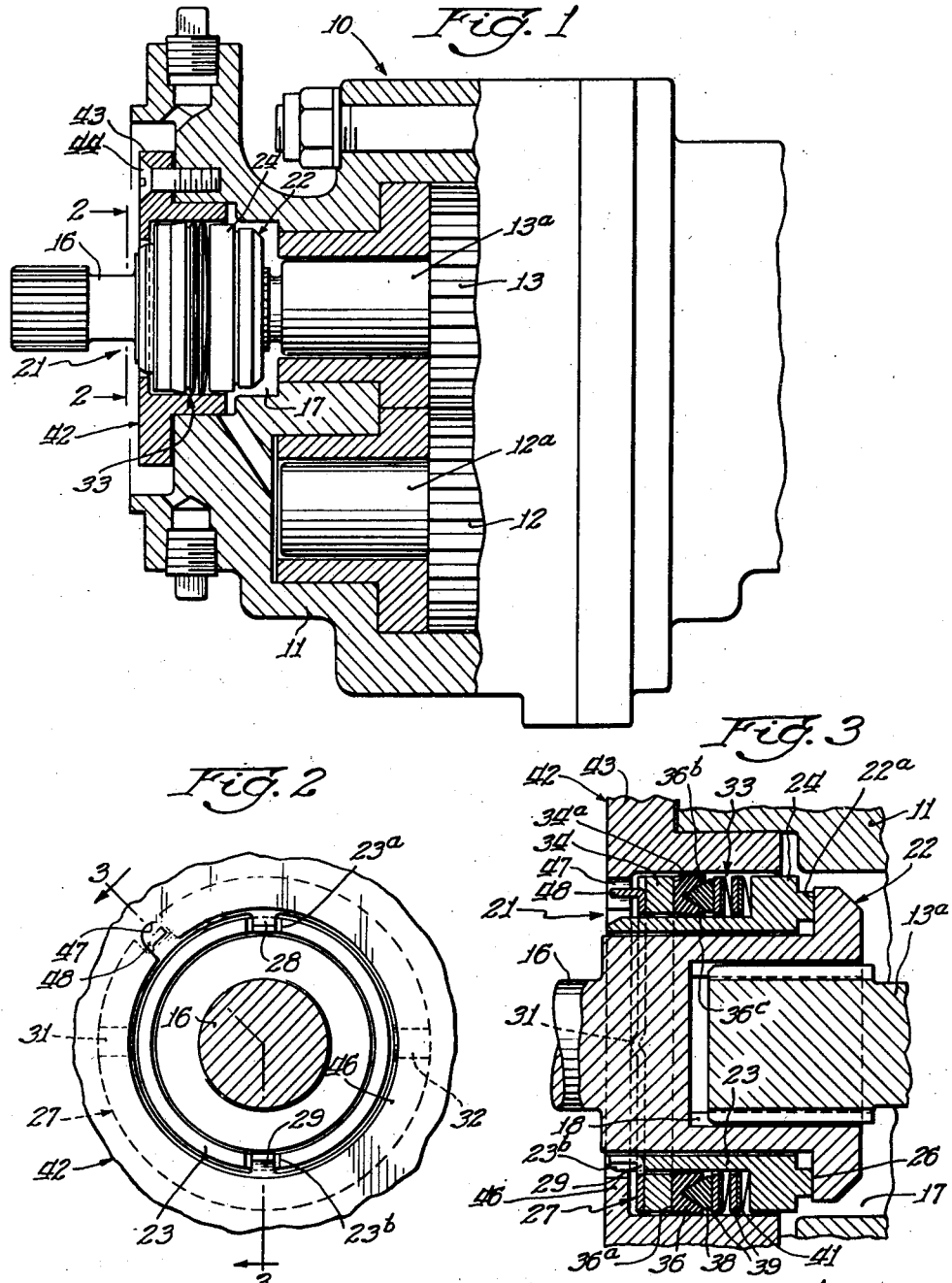
Inventor:
George E. Pasco Patented Apr. 29, 1947

2,419,588

UNITED STATES PATENT OFFICE 2,419,588

SEAL FOR ROTARY SHAFTS

George E. Pasco, Euclid, Ohio, assignor, by mesne assignments, to Borg-Warner Corporation, Chicago, Ill., a corporation of Illinois Application February 26, 1945, Serial No. 579,779

2 Claims. (Cl. 286—7)

1

This invention relates to rotary shaft sealing arrangements.

It has been found that in rotary fluid sealing arrangements for gear pump couplings and the like, requiring a limited adjustment for misalignment, previously employed seals lack sufficient flexibility for efficient operation and maintenance in the presence of this changing alignment.

It is an object of this invention to provide an improved, simple and efficient seal arrangement which is both effective to take care of slight misalignment and at the same time maintain the requisite fluid pressure seal during prolonged rotation.

It is a more particular object to provide an improved seal arrangement of the present type having a seal alignment maintaining member rockably about a pair of axes disposed 90° apart, the alignment maintaining member being effective to keep the fluid sealing elements in the proper sealing relation notwithstanding limited misalignment between the coupling elements.

The above and other objects, advantages and uses of my invention will become apparent from a reading of the following specification and claims taken in connection with the accompanying drawings which form a part thereof and wherein:

Fig. 1 is a broken away sectional view of a gear pump incorporating a preferred embodiment of the present invention;

Fig. 2 is an enlarged broken away view taken substantially on the line 2—2 of Fig. 1; and Fig. 3 is an enlarged broken away cross-sectional view taken substantially on the line 3—3 of Fig. 2.

Referring in greater detail to the figures of the drawing the present invention is disclosed in the preferred embodiment thereof in the relation which the same occupies in a gear pump indicated generally at 10, including a housing 11 having a pump chamber receiving a pair of intermeshing gears 12, 13 with journals 12a, 13a. These gears 12 and 13 are driven for the purpose of generating fluid pressure by means of a rotary shaft coupling element 16 extending into an outwardly opening recess 17 in a housing 11 and internally splined at 18 for cooperation with complementary formed splines on the elongated terminal of journal 13a. As is well known, it has been found desirable to provide for limited flexibility and misalignment between the source of power connected to the outer terminal of rotary shaft coupling element 16 and journal 13a of gear 13. It has been further found necessary to provide a fluid seal between housing 11 and rotary shaft

2 coupling element 16 in order to prevent the undesirable leakage of the pressure fluid from recess 17 outwardly past the rotary coupling shaft element.

It is to the improved arrangement of this seal indicated generally at 21 that the present invention is particularly directed.

Rotary shaft seal arrangement 21 includes generally a radially outwardly extending flange 22 carried on the inner portion of rotary shaft element 16. An elongated fluid seal supporting tubular member 23 embraces rotary shaft element 16 and in turn has a radially outwardly extending flange 24 on the inner portion thereof, the inner terminal face 26 of elongated member 23 engaging rotary shaft element flange 22 in sealed bearing relation. An aligning pressed sheet-metal washer indicated generally at 27 is formed with a first pair of radially inwardly extending diametrically opposed rocker portions 28, 29 engaged within axially extending slots 23a and 23b in the portion of elongated tubular member 23, washer 27 being additionally provided with a second pair of axially extending diametrically opposed rocker portions 31, 32 facing outwardly and engaging a suitable support carried by the housing as will appear. This provides for the effective rocking or adjustment about rocker portions 28, 29, 31 and 32 for maintaining the requisite alignment of face 26 with inner face 22a of flange 22.

Carried by elongated tubular member 23 and interposed between the back face of flange 24 and the radial outer portion of aligning washer 27 is a flexible fluid sealing assembly proper indicated generally at 33. This seal unit proper 33 preferably includes a rectangular cross-section continuous ring or washer 34 having an appreciable axial dimension sufficient to give the same the requisite rigidity and provide a flat sealing face 34a. A flexible fluid seal ring 36 preferably of synthetic rubber or its equivalent has a complementary flat nose portion 36a engageable with surface 34a of ring 34 and further includes divergent lips 36b, 36c. Spreader ring 38 of generally triangular cross-section, extends into spreading relation between lips 36b, 36c, this ring too being preferably composed of synthetic rubber or its equivalent. Engaging the back side of conical spreader ring 38 is a flat washer 39 in turn engaged by a wavy or undulated spring washer 41. A plurality of these flat washers and undulated spring washers are preferably employed as it has been found that this improves the operation in certain installations.

To facilitate the installation and maintenance of the present seal unit a thrust and seal plate member 42 is provided which includes an axially inwardly extending tubular portion received within the recess 17, a radially outwardly flanged portion 43 adapted to be attached to the housing as by screws 44 and a radially inwardly extending thrust and locking flange 46. Flange 46 functions to support the end thrust from rocker portions 31 and 32 of aligning washer 27 and is further provided with an opening or slot 47 functioning to receive an additional protuberance 48 carried on aligning washer 27 for the purpose of locking the washer against arcuate movement.

It will thus appear that by providing elongated tubular support 23 for the seal unit 33 and further providing the aligning washer 27 having the rocking or universal joint characteristics, this rocker being operated at an appreciable distance from sealing faces 22a and 26, that a markedly improved sealing arrangement is realized.

In the more specific aspects it will be seen that by employing a generally V-shaped flexible seal with a spreader ring as well as the flat washer and undulating spring washer in the relationship described, the sealing efficiency has been still further improved. Finally, by employing the thrust and seal plate member 42, in the relationship shown, it is made practicable to quickly install the assembly within a housing, in operative relationship with the rotary shaft coupling element.

While the present invention has been disclosed in connection with a specific embodiment thereof it is to be understood that this is by way of assembly and not limitation, it being intended that the present invention be defined by the appended claims.

I claim:

1. In a rotary shaft seal arrangement including a housing having an outwardly opening recess therein, a rotary shaft element extending into said recess in radially spaced relation thereto, a radially extending flange on said rotary shaft element located within said recess; an elongated tubular fluid seal supporting member embracing said rotary shaft element at least a major portion of which tubular member is disposed within said recess, said tubular member having a radially outwardly extending flange on the inner portion thereof, the inner terminal of said elongated tubular member engaging said rotary shaft element radial flange in sealed bearing relation; an aligning member having a first pair of diametrically opposed rocker portions, means carried by said housing supportably engaged by said rocker portions, a second pair of diametrically opposed rocker portions on said aligning member removed arcuately 90° from said first rocker portions, said second pair of rocker portions being engaged by the outer terminal of said elongated tubular member; and flexible fluid seal defining means carried by said elongated tubular member between the radial flange thereon and said aligning washer.

2. In a rotary shaft seal arrangement including a housing having an outwardly opening recess, a rotary shaft element extending into said recess in radially spaced relation thereto, a radially outwardly extending flange on said rotary shaft element located within said recess; an elongated tubular fluid seal supporting member embracing said rotary shaft element at least the major portion of which member is disposed within said recess, said member having a radially outwardly extending flange on the inner portion thereof within said recess, the inner terminal of said elongated tubular member sealably engaging said rotary shaft element flange in bearing relation; aligning means including a washer having a first pair of radially inwardly extending diametrically opposed rocker portions, supporting means carried by said housing for engagement by said first pair of rocker portions, a second pair of axially extending diametrically opposed rocker portions on said washer removed arcuately 90° from said rocker portions, and a protuberance on said washer engaged in a recess in said housing preventing arcuate movement of said aligning washer; and flexible fluid seal defining means interposed between said aligning washer and the back side of said elongated tubular member flange including, a generally V-shaped fluid sealing ring, a spreader ring extending between the lips of said V-shaped seal, and a spring washer positioned between said spreader ring and said elongated tubular member flange carried by said elongated tubular member for resiliently urging said spreader ring into spreading relation with the lips of said V-shaped seal, said spring washer being also effective to maintain said elongated tubular member in sealing engagement with the flange of said rotary shaft element.

GEORGE E. PASCO.

REFERENCES CITED

The following references are of record in the file of this patent:

UNITED STATES PATENTS

| Number | Name | Date |
|---|---|---|
| 2,233,599 | Gilbert | Mar. 4, 1941 |
| 2,220,771 | McHugh | Nov. 5, 1940 |
| 1,897,937 | Joyce | Feb. 14, 1933 |
| 2,365,046 | Bottomley | Dec. 12, 1944 |